United States Patent
Kurtz et al.

(10) Patent No.: US 7,762,139 B2
(45) Date of Patent: Jul. 27, 2010

(54) PRESSURE TRANSDUCER APPARATUS ADAPTED TO MEASURE ENGINE PRESSURE PARAMETERS

(75) Inventors: Anthony D. Kurtz, Saddle River, NJ (US); Scott Goodman, Wayne, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 12/313,761

(22) Filed: Nov. 24, 2008

(65) Prior Publication Data

US 2009/0114028 A1 May 7, 2009

Related U.S. Application Data

(63) Continuation of application No. 11/973,507, filed on Oct. 9, 2007, now Pat. No. 7,540,196, which is a continuation of application No. 11/486,351, filed on Jul. 13, 2006, now Pat. No. 7,275,444.

(51) Int. Cl.
*G01L 7/00* (2006.01)
(52) U.S. Cl. .......................................... 73/714; 73/756
(58) Field of Classification Search .................. None
See application file for complete search history.

(56) References Cited

U.S. PATENT DOCUMENTS

| | | | |
|---|---|---|---|
| 4,835,717 A * | 5/1989 | Michel et al. | 702/51 |
| 6,176,137 B1 | 1/2001 | Sasaki et al. | |
| 6,272,928 B1 | 8/2001 | Kurtz | |
| 6,484,585 B1 | 11/2002 | Sittler et al. | |
| 6,543,291 B1 | 4/2003 | Kurtz et al. | |
| 6,584,851 B2 | 7/2003 | Yamagishi et al. | |
| 6,612,179 B1 | 9/2003 | Kurtz | |
| 6,651,508 B2 | 11/2003 | Baba et al. | |
| 6,782,754 B1 * | 8/2004 | Broden et al. | 73/753 |
| 7,057,247 B2 | 6/2006 | Kurtz | |

\* cited by examiner

*Primary Examiner*—Lisa M Caputo
*Assistant Examiner*—Jermaine Jenkins
(74) *Attorney, Agent, or Firm*—Troutman Sanders LLP; James E. Schutz; Jihan A. R. Jenkins

(57) ABSTRACT

A pressure header assembly has a closed front and back surface. The back surface has an aperture for accommodating a separate dual die pressure header. The dual die pressure header has an absolute and differential pressure sensor positioned thereon. A differential pressure port is located on a side surface of the pressure header assembly and is directed to a bore in the pressure header assembly. The bore contains an elongated tube which is positioned in the pressure header assembly and locked in place by means of a crush nut and locking nut assembly. One end of the tube is coupled to the differential pressure port, while the other end of the tube accommodates a differential pressure tube which is bent in an arcuate position and directed to the underside of the sensor of the differential sensor assembly mounted in the dual die pressure header. Suitable leads from the dual die pressure header assembly are directed to a terminal board which is mounted within a pressure transducer housing shell, which terminal board coacts with an outboard contact cap assembly forming the transducer. The pressure header assembly portion also contains extending tabs which have apertures for external mounting.

4 Claims, 7 Drawing Sheets

PRESSURE TRANSDUCER APPARATUS ADAPTED TO MEASURE ENGINE PRESSURE PARAMETERS

CROSS-REFERENCE TO RELATED APPLICATION

This application is a continuation of U.S. patent application Ser. No. 11/973,507, entitled PRESSURE TRANSDUCER APPARATUS ADAPTED TO MEASURE ENGINE PRESSURE PARAMETERS, filed Oct. 9, 2007, which is a continuation of U.S. patent application Ser. No. 11/486,351 entitled PRESSURE TRANSDUCER APPARATUS ADAPTED TO MEASURE ENGINE PRESSURE PARAMETERS, filed Jul. 13, 2006, now U.S. Pat. No. 7,275,444, the entire disclosure of which is hereby incorporated in its entirety by reference into this application.

FIELD OF THE INVENTION

This invention relates to pressure transducers in general and more particularly to a pressure transducer apparatus adapted to measure engine pressure parameters including the pressures at the engine fuel and oil filters.

BACKGROUND OF THE INVENTION

Pressure transducers have been widely employed in many environments in order to monitor pressure. Such environments include very harsh environments such as monitoring pressure in automotive internal combustion engines, aircraft engines as well as in other environments which are subjected to relatively high pressures and high temperatures. It is desirable to monitor engine pressures in order to determine proper operation of an engine during extreme conditions. These engines can of course be automotive engines, or aircraft engines as well as engines utilized in missiles or in other devices.

A purpose of taking pressure measurements in conjunction with engines is to determine the fuel and oil filter pressures and thus, to provide pressure data that will be used to determine important engine filter maintenance. As one can ascertain, especially in regard to aircraft engines, the measurement of pressure regarding the engine fuel filter and oil filter pressures involve relatively high temperatures as well as high pressures.

Pressure is determined in terms of an absolute pressure, so that the absolute pressure can be monitored to determine overall engine performance and also to determine when the filters need to be replaced. This can be done by utilizing the pressure measurements obtained from the pressure transducer and applying such measurements to a microprocessor or other computing device to determine when pressures fall outside a desired range and therefore to make some determination of whether the filters have to be replaced.

In order to facilitate such measurements, it would be desirable to reduce the number of pressure transducer assemblies required to determine such operation. Cognizant of this problem, the prior art would utilize two independent absolute measurements for each filter. One pressure transducer would be upstream of the filter and one pressure transducer would be downstream of the filter. In this manner there would be four transducers utilized per engine. In order to reduce the number of transducers, the present approach enables one to mount two independent sensors into two different transducers. In this manner the fuel filter transducer would measure pressure both upstream and downstream and the oil filter transducer would perform the same function.

The apparatus according to embodiments of the present invention would allow two less transducers per engine and result in a reduced interface piece per count at a reduced weight and lower cost.

Use of two pressure sensors in one transducer is described in, for example, U.S. Pat. No. 6,272,928 entitled "Hermetically Sealed Absolute and Differential Pressure Transducer" issued on Aug. 14, 2001 to A. D. Kurtz, and assigned to the assignee herein Kulite Semiconductor Products, Inc. That patent depicts a single semiconductor chip which includes dielectrically isolated leadless pressure sensors adapted to simultaneously measure a first pressure and a differential pressure between the first pressure and a second pressure. The chip includes a wafer, which includes first and second recessed portions defining first and second diaphragm areas. There is a rim portion formed between the first and second recess portions for isolating the first diaphragm from the second diaphragm. A first circuit is mounted on the first diaphragm and responsive to the first pressure and a second circuit is mounted on the second diaphragm and responsive to the second pressure. The first and second circuits can be electrically coupled to one another so as to cooperatively provide a common output indicative of differential pressure associated with the first and second pressures, while simultaneously providing an output indicative of either the first or second pressures.

FIG. 1 of the above-noted patent illustrates a plan view of a sensor structure formed on a single wafer. The structure includes two independent open four active arm Wheatstone bridges each having six contact areas or fingers respectively. Each bridge has its own active area defined by an associated deflectable diaphragm. Open bridges are depicted in FIG. 2 of the patent and the various bridge configurations can be interconnected to provide an output proportional to the pressure difference between a first and second pressure as well as providing an output indicative of the first and second pressures. Also indicated in that patent are other instances where it is necessary to simultaneously measure both the absolute and differential pressure. Such devices can be used to determine aircraft speed where speed is measured by measuring the total pressure which is the pressure against the nose of the aircraft as it moves through the air and the static pressure which is the atmospheric pressure surrounding the aircraft. The air speed is proportional to the difference between a total and static pressure. See also U.S. Pat. No. 6,612,179 issued on Sep. 2, 2003, entitled "Method and Apparatus for the Determination of Absolute Pressure and Differential Pressure Therefrom" to A. D. Kurtz, and assigned to Kulite Semiconductor Products, Inc. That patent depicts a combination absolute and differential pressure sensing device, which includes a plurality of absolute pressure transducers, each transducer including a plurality of half-bridge piezoresistive structures. The device selectively couples at least one of the plurality of half-bridge structures through a first one of the absolute pressure transducers to form a half active full bridge structure adapted to measure an absolute pressure. At least one other of the plurality of half bridge piezoresistive structures is connected to at least one of the half bridge structures of a second absolute pressure transducer to form a full bridge adapted to measure a differential pressure. The structure is depicted in FIG. 1 and FIG. 2 of the above patent, with various circuit configurations depicted in FIGS. 3-6. See also U.S. Pat. No. 7,057,247 entitled "Combined Absolute Differential Transducer" issued on Jun. 6, 2006 to A. D. Kurtz et al and assigned to the assignee herein. That patent describes a combined absolute differential pressure transducer which consists of two sensors made from the same silicon wafer. The patent shows both separate absolute and differential sensor wafers or dies as well as a single wafer or die containing only an absolute and differential pressure sensor.

Although prior patents illustrate providing two pressure sensors in a single pressure transducer structure, it is however, desirable to provide an improved pressure transducer assembly for monitoring engine parameters such as fuel and oil filter pressure values in an engine, in a simplified and economical manner and with high temperature operation, in a relatively small and rugged device.

SUMMARY OF THE INVENTION

A pressure transducer apparatus, comprising: a pressure transducer header of a cylindrical shape and having closed front and back surfaces, with the front surface having a main pressure port opening, the opening extending from the front surface towards the back surface, the back surface having a pressure die accommodating opening therein which opening communicates with the pressure port opening, a differential pressure port opening on a side surface of the pressure transducer header, a bore having an opening in the back surface and extending towards the front surface, with the differential pressure port communicating with the bore, a die accommodating header having top surface and a rear surface, the header of a shape corresponding to the shape of the pressure die accommodating opening with the die accommodating header to be inserted therein, the die header having a first set of terminal apertures on the top surface extending to the rear surface, a second set of terminal apertures on the top surface also extending to the rear surface, the second set of terminals surrounding a differential pressure port opening which opening extends from the top surface of the die header to the bottom surface, terminal pins inserted into the terminal apertures to extend from the top surface and directed to the rear surface and to extend beyond the rear surface, a first pressure transducer die positioned on the top surface of the die header and connected to the first set of terminal pins, a second pressure transducer die positioned on the top surface and connected to the second set of terminals, each of the pressure transducer dies having a deflectable diaphragm and having located thereon pressure responsive sensors which vary resistance according to an applied pressure, a differential pressure tube extending from the bore opening in the rear surface of the pressure transducer header to the differential port opening of the die header, where when a first pressure is applied to the main pressure port opening both pressure transducer dies receive the first pressure, and when a second pressure is applied to the differential port only the second pressure transducer receives the pressure, so that the first pressure transducer provides an output indicative of the absolute value of the first pressure with the second transducer providing an output indicative of the difference between the first pressure and the differential pressure.

DETAILED DESCRIPTION OF THE INVENTION

Figure 1:
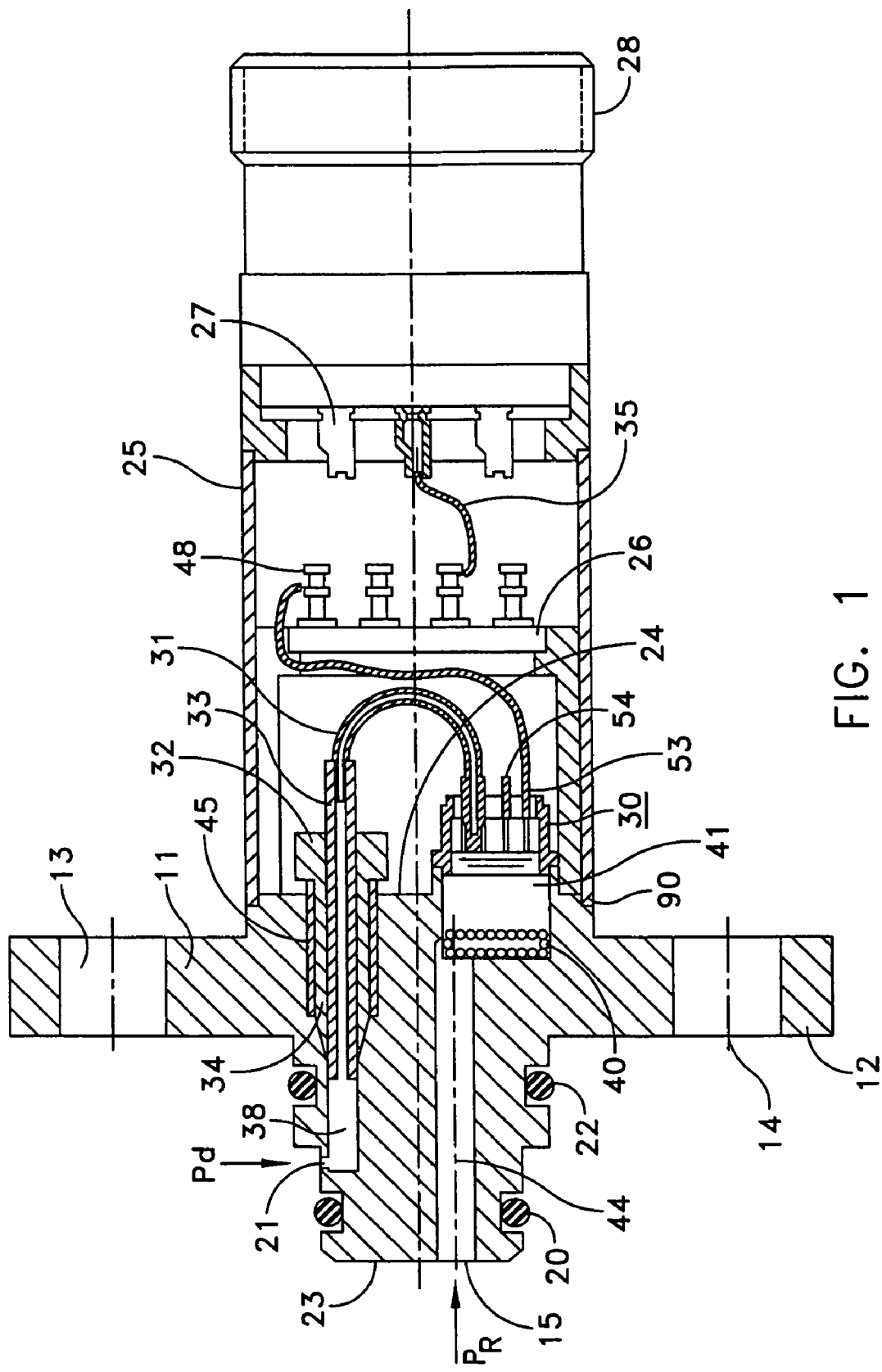
FIG. 1 is a cross-sectional view taken through line 1-1 of FIG. 2 depicting a pressure transducer assembly according to an embodiment of the invention.
Figure 2:
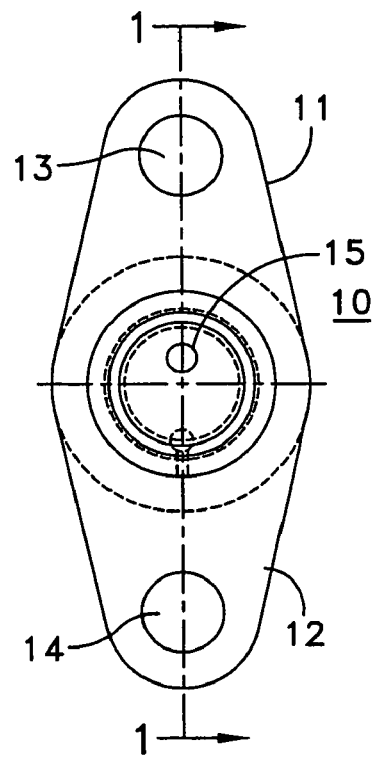
FIG. 2 is a top plan view of the pressure transducer assembly.

Referring to FIGS. 1 and 2, there is shown a header which is an integral part of the pressure transducer assembly to be described. Essentially FIG. 2 shows a top-plan view of the pressure transducer header according to an embodiment of the invention. The header 10 has a cylindrical front portion with a closed top surface 23 and a closed rear or bottom surface 24.

The cylindrical header 10 has extending tabs 11 and 12 near the rear surface 24. The tabs extend radially from opposing side surfaces of the header 10. Each tab 11 and 12 has an aperture 13 and 14 in order to secure the transducer in a suitable position. The transducer header 10 has a pressure port 15, which receives a reference or absolute pressure. The reference pressure can be the pressure which exists in a fuel line of an automotive engine or some other pressure source and basically will be referred to as a reference or absolute input pressure.

FIG. 1 is a cross-sectional view taken through line 1-1 of FIG. 2. Thus, as seen in FIG. 1, the extending tabs or extending flanges 11 and 12 are shown in cross-sectional view with their accommodating apertures 13 and 14. The pressure port 15 has a front opening on the front surface 23 of the cylindrical pressure transducer header 10 extends through a bore 44 in the header housing 10. The bore 44 enters a cavity 41. In cavity 41 as will be explained, is positioned a dual die header assembly 30, which header assembly 30 accommodates an absolute and differential pressure transducer or die. Each pressure die contains a full Wheatstone bridge and is operative to produce a voltage output when a pressure is applied to a deflecting diaphragm surface of the pressure transducer or pressure die.

As seen in FIG. 1, the cavity 40 contains the header 30 which contains an absolute and differential pressure assembly. The header 40 further has leads 41 which are directed to a terminal board 26. There are conventionally four leads from each die as leads 41, which are directed to the terminal board 26 to enable one to bias and obtain output signals from the transducers.

In the embodiment of FIG. 1, header 10 has a differential pressure port input 21 in the side surface of the header. Input port 21 is directed to interface with a bore 38. The bore 38 is directed to a tube 33 associated with a lock nut structure 32 and a crush ring 34. The lock ring or lock nut 32 is positioned in an aperture 45 within the header 10. The aperture 45 also contains the crush nut 34. As the lock nut 32 is pushed into the housing, the crush nut impinges on the sides of the header 10 about aperture 45 which crush nut firmly seals the assembly in the aperture 45. The tube 33 is held by the lock nut and crush ring and is also firmly secured. The crush nut 34 forms a tight seal from the differential port without the need for welding, soldering and so on.

As seen in FIG. 1, the tube 33 associated with the above-noted locking assembly and which is associated with the differential input port 21, has a further reference tube 31 coupled to an output. The tube 31 is inserted at one end into the bore of tube 33 and has an arcuate bend to enable the tube 31 to extend into the header 30. This tube 31 supplies the differential pressure to the underside of one of the diaphragm areas of the die located within the header 30.

Also shown in FIG. 1, is a filter 40, which filter, may or may not be included. If included, the filter 40 operates to filter or remove particles or contaminants which may be carried by the pressure medium and which may enter bore 44 via port 15 during operation.

As seen in FIG. 1, a differential pressure $P_d$ is applied to the port 21, while the reference or absolute pressure $P_R$ is applied to port 15. As previously indicated, pressure $P_R$ for example, may be a fuel pressure in an engine or an oil pressure in an engine while the pressure $P_d$ (the differential pressure) may be the pressure on the other side of the fuel filter or on the other side of the oil filter. In this manner, as will be described, one of the sensors contained in the header assembly 30 will produce an output which is the difference of pressure between $P_R$ and $P_d$. This differential pressure enables an automotive manufacturer to determine the pressure difference between for example, the input and output of a filter. It is indicated that such a transducer can be used to monitor oil pressure data or fuel pressure data.

Also seen in FIG. 1, the pressure header assembly 10 has O-rings 20 and 22 which each are retained within a circumferential bore about the top portion of the pressure header 10 to enable mounting or insertion into a suitable aperture where a pressure is to be monitored. Thus the above-noted header 10 as described mainly contains a differential and a reference pressure port and contains an opening 41 to accommodate a dual die header 30. The term dual die header is utilized to indicate that the header 30 contains an absolute and a differential pressure die, which essentially is an absolute pressure Wheatstone bridge and a differential pressure Wheatstone bridge.

The header 10 is now coupled to an external cylindrical shell 25 which is secured to the header 10 and which contains the terminal board 26. The cylindrical shell 25 surrounds and protects the leads 53, 54 and terminal board 26. The terminal board 26 as seen in FIG. 1 is mounted within the cavity of the outer shell 25. The outer shell 25 also contains an output aperture which accommodates an output capping member 28. The capping member or cap 28 contains contacts 27 which interface via connections or wires 35 with contacts 48 on the terminal board assembly. This contact assembly or header 28 is utilized to interface with external devices. In this manner all of the output leads for the pressure transducers which are contained within the header 30 are directed via the terminal board 26 to contacts 27 to the output aperture of cap 28. The pressure sensors can receive biasing voltages while the output of the Wheatstone bridges can also be directed through the terminal board and hence, through the output connectors. The shell 25 has the front opening inserted into the flanged channel 26 of the header 10.

Figure 3:
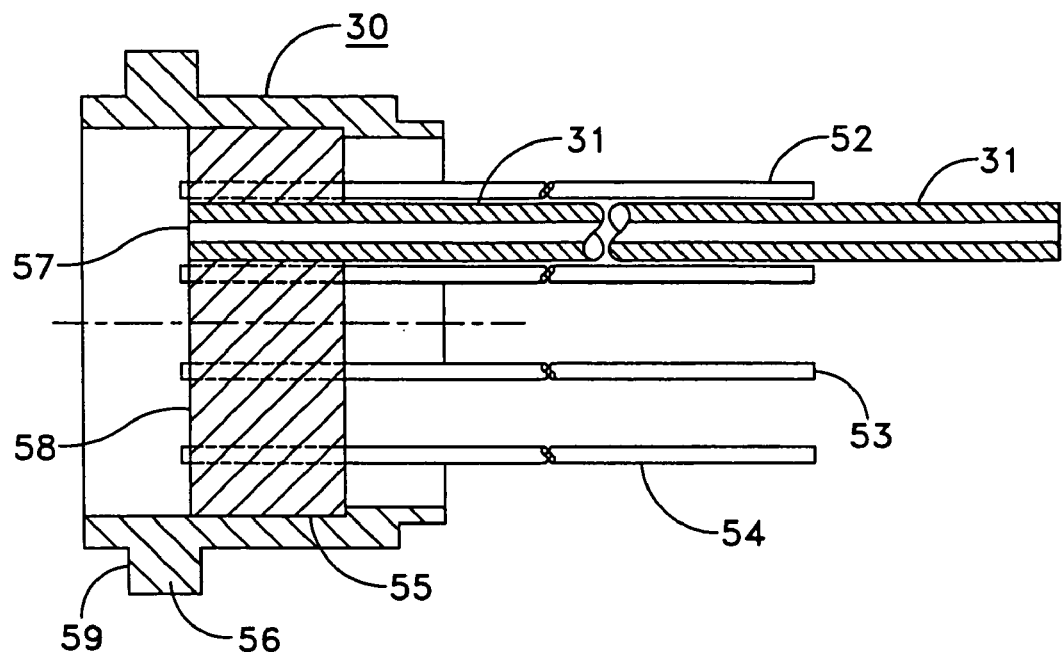
FIG. 3 is a cross-sectional view taken through line 3-3 of FIG. 4 depicting a dual die header assembly for accommodating an absolute and differential pressure sensor die according to an embodiment of the invention.
Figure 4:
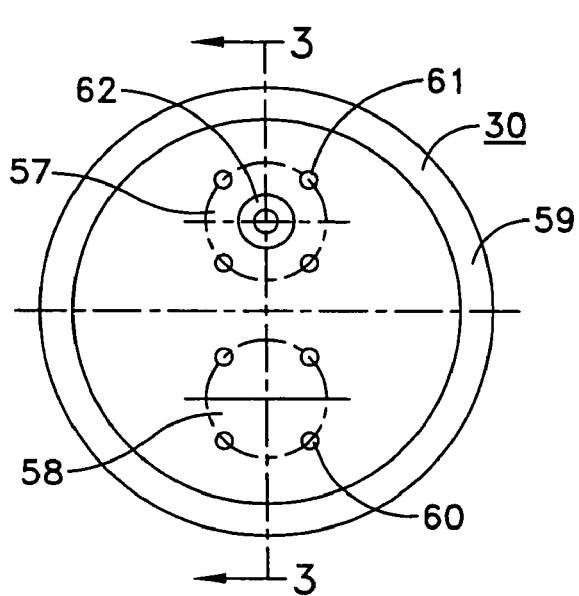
FIG. 4 is a top plan view of the header assembly depicted in FIG. 3.

Now referring to FIGS. 3 and 4, there is shown the double die header 30 depicted in FIG. 1. FIG. 4 shows a top-plan view of the header 30 as shown in FIG. 1. The header 30 has a peripheral flange 59 and as seen from the top-plan the header 30 has two area locations 57 and 58. Each location 57 and 58 has four apertures arranged in a circular pattern, as illustrated by aperture 61 associated with area 57, and aperture 60 associated with area 58. There are four apertures associated with areas 57 and 58 and they are arranged in a circular pattern. Area 57 further has an opening 62 which is a differential pressure input. The opening or input applies the differential pressure to the back of a deflecting diaphragm associated with the differential wafer die while the front of the diaphragm receives the absolute or reference pressure. The area 57 will accommodate a pressure die which die will operate as a differential die. In the embodiment of FIG. 4, each of the four apertures 60, 61 associated with areas 58, 57, respectively, are uniformly arranged in a circular configuration. As shown in FIG. 4, opening 62 is positioned central to the apertures 61 within the area 57.

The tube 31 (FIG. 1) which is associated with the differential pressure port 21 terminates within opening 62 of the header 30. This tube as indicated, supplies a differential pressure to the underside of the differential die or diaphragm. The absolute or reference pressure will be applied to the top surface of a die which is located in area 58. This die is referred to as an absolute die and receives the reference pressure $P_R$ via the bore 44 as seen in FIG. 1. It is also noted, that the die associated with area 57 or differential die also receives the pressure $P_R$. Therefore, the differential pressure sensor will produce an output pressure indicative of the difference of $P_R$ and $P_d$. The absolute pressure will produce an output pressure strictly in accordance with the pressure $P_R$ as applied thereto.

As one can also understand, the actual semiconductor dies can basically constitute a single die which contains two full Wheatstone bridges. The die would be placed within the header on top of the areas 57 and 58 where contacts from the die will be directed through the suitable apertures such as 60 and 61.

It is preferable that two separate dies be employed in most applications. The reason for two separate dies is that the pressure $P_R$ may be a very large pressure as compared to $P_d$ (or vice versa). Even though the differential pressure as exhibited by one die will be less, as it is the difference between $P_R$ and $P_d$ and therefore the wafer diaphragm can be thinner, it is understood that if the differential pressure source fails, the diaphragm may rupture. Therefore, it is preferable to employ two different dies so that one may utilize a thinner diaphragm for the differential transducer while also assuring that this diaphragm will not rupture in the event that the differential pressure source fails and therefore only the absolute pressure is applied (or vice versa).

FIG. 3 is a cross-sectional view of FIG. 4 taken through lines 3-3. As seen, the cross-sectional view of FIG. 3 is analogous to the cross-sectional view of the header 30 depicted in FIG. 1. As seen the header 30 has the peripheral flange 59 which enables it to be mounted within the area 41 of the pressure header structure 10 of FIG. 1. The areas 57 and 58 are shown with contacts positioned within the apertures. Contact terminals 52, 53 and 54 are each positioned within an aperture as for example apertures 60, 61.

Also shown is the reference tube 31 directed into the aperture 62 associated with the header 30. The reference tube 31 supplies the differential pressure to the underside of an active diaphragm area associated with a die and which die will be positioned over the area 57 in the case of a differential die and over the area 58 in the case of an absolute die.

Before proceeding with further explanation, reference is made to the above noted U.S. Pat. No. 7,057,247 which issued on Jun. 6, 2006, to A. D. Kurtz et al, and assigned to the assignee herein. That patent is entitled "Combined Absolute Differential Transducer" and shows a combined absolute and differential pressure transducer which basically consists of two sensors made from the same silicon wafer and is selected to be adjacent to each other on the wafer. The sensors can be individual dies which basically are fabricated during the same process on the silicon wafer.

In this manner, both sensors are very closely matched both thermally and otherwise. The same pressure which is the $P_R$ is applied to one side of both sensors and a second pressure, which is the differential pressure, is applied via the tube 31 to the differential sensor to cause that sensor to produce an output indicative of the difference between pressures. This aspect of operation and structure is described in U.S. Pat. No. 7,057,247, the entire specification and disclosure of which is incorporated by reference herein as if fully recited herein. The patent explains how to select dies or pressure transducers with the same diaphragm thickness but which may have different size active areas where the thermal coefficients and thermal sensitivities are controlled by the purity and concentration of the P regions of the sensors and by how well they match each other.

Thus, as in the present invention, thermal properties of two individual sensors are closely controlled and matched to each other, which result in an improved overall combined absolute and differential transducer. A major aspect of the present invention relates to the housing structures to accommodate the sensors in a convenient and compact package, which is rugged and therefore capable of operating in harsh environments.

In the above-noted U.S. Pat. No. 7,057,247, FIGS. 7A and 7B show a header structure which is similar to the header structure 30 without certain of the mechanical characteristics employed in this invention. FIGS. 7A and 7B of that patent show an absolute and a differential die mounted on the header. FIG. 7C shows a cross-sectional view. It is understood from the above patent that the differential and absolute dies can be separate dies, or separate wafers or can be employed on a single wafer.

Again referring to FIG. 3, the cross-sectional view of the wafer shown also has a glass header 55 which serves as an insulator. The header 55 accommodates the pins as well as the reference tube and serves to insulate the semiconductor dies from the environment. Such a header is shown in above-noted Pat. No. 7,057,247 in FIGS. 8A-8D. In that patent FIGS. 6A and 6B show single dies which may be employed for the absolute and differential pressures while FIG. 6C shows a single die having a both an absolute and a differential pressure sensor positioned thereon. Either configuration can be employed. However, it is preferred to utilize separate dies for the differential and absolute structures.

Figure 5:
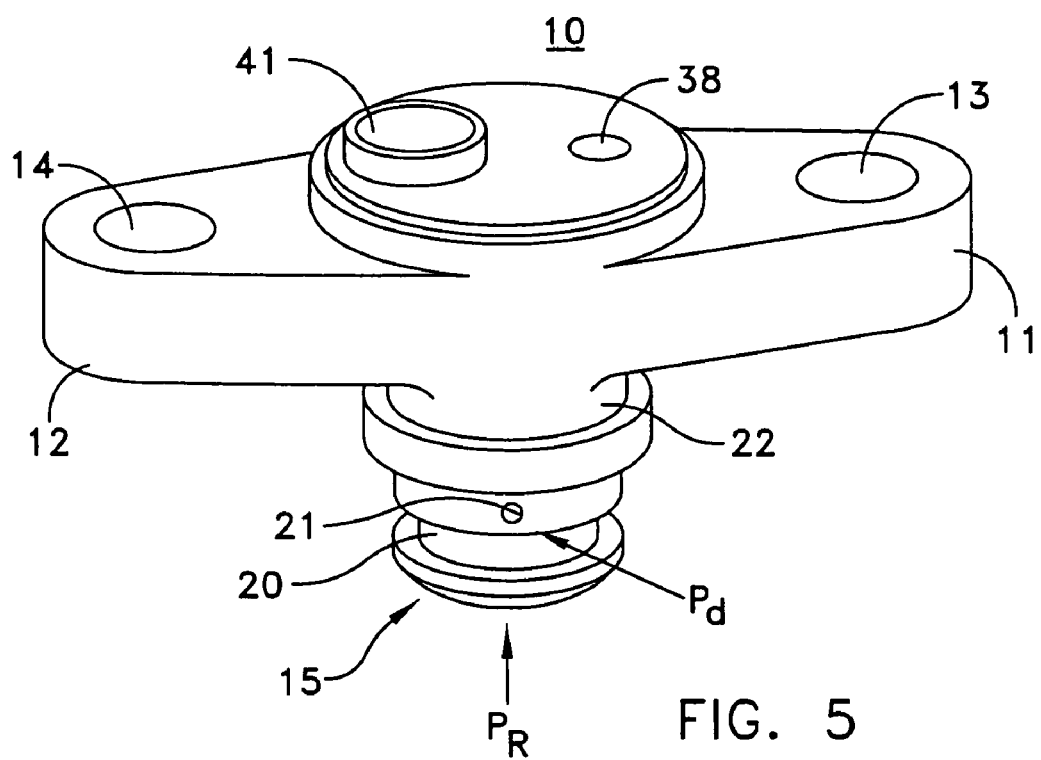
FIG. 5 is a perspective view of a pressure header assembly according to an embodiment of the invention.
Figure 6:
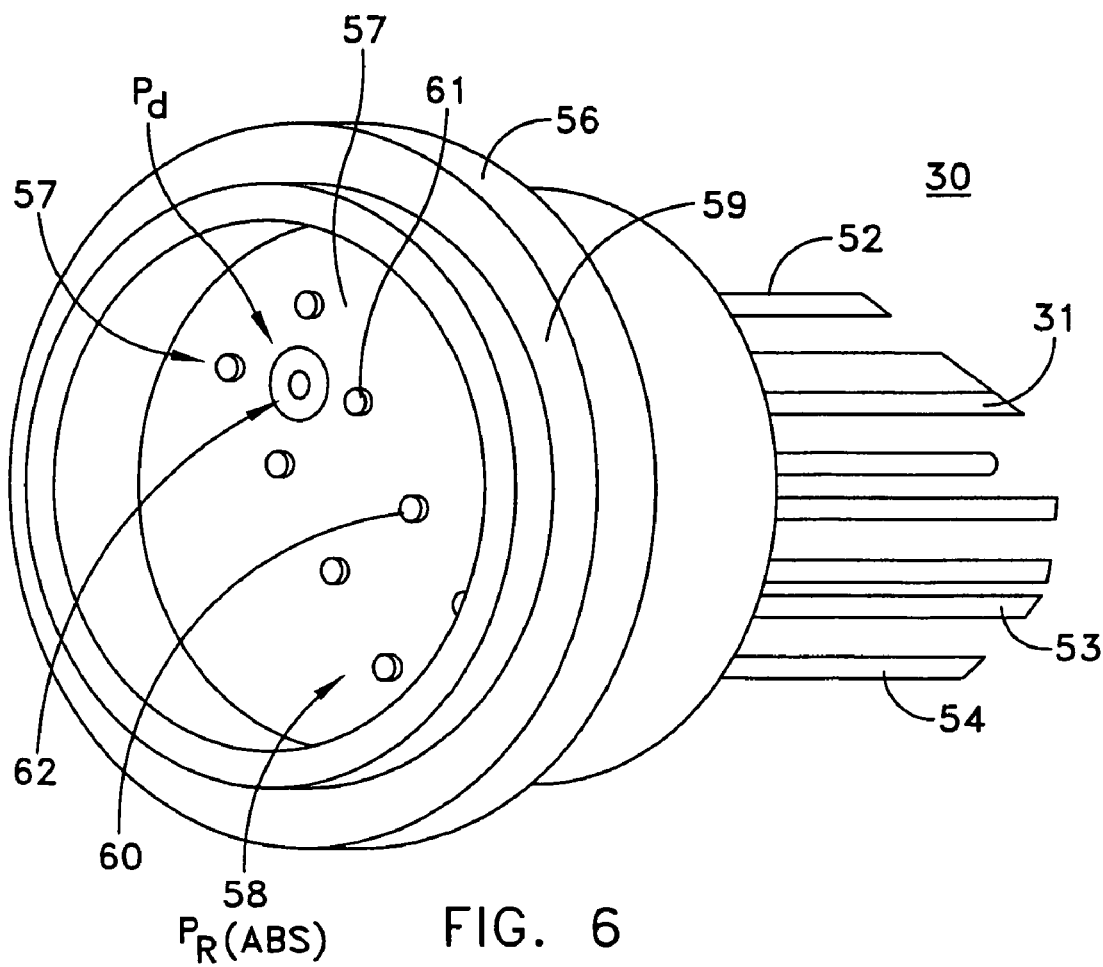
FIG. 6 is a perspective view of a dual die header assembly according to an embodiment of the invention.

Referring to FIG. 5, there is shown a perspective view of the cylindrical pressure transducer header assembly 10 as depicted in FIG. 1. As seen from FIG. 5 the same reference numerals have been utilized to designated like parts. There is shown the extending flanges 11 and 12 with their associated apertures 13 and 14. The reference numeral 38 refers to the bore 38 of FIG. 1, which extends through the tube 33 and which will eventually accommodate the reference tube 31. Tube 31 brings the differential pressure to the underside of the differential die. Opening 41 eventually receives the header 30 and there is shown the differential pressure port 21. FIG. 6 depicts a perspective view of the header 30. In FIG. 6 the same reference numerals have also been utilized to designate the same parts.

Figure 7:
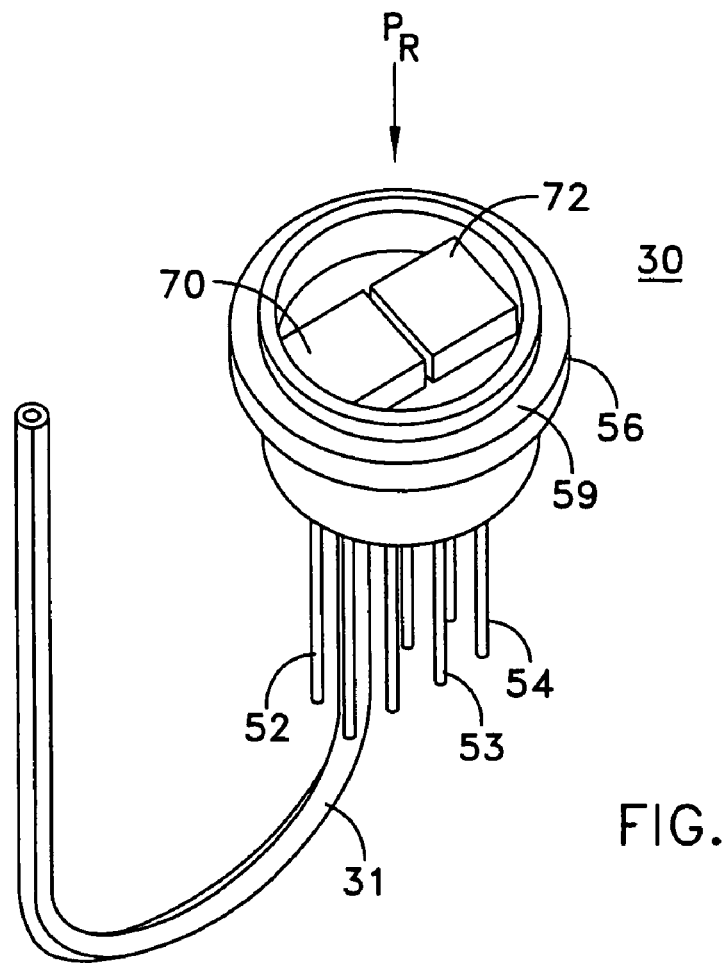
FIG. 7 is a perspective view of the dual die header assembly accommodating a differential and absolute pressure assembly and a reference tube according to an embodiment of the invention.

Also seen in FIG. 6 is the contact or leads 53, 54 which are coupled through the apertures in the header. The area 58 of the absolute pressure die which receives pressure $P_R$ is depicted. The area or position 57 of the differential die is also depicted. FIG. 6 provides a more detailed illustration of the structure of the header 30 as depicted in FIGS. 3 and 4. Referring to FIG. 7, there is shown the header 30 with the reference tube 31 bent in an arcuate shape and coupled to opening 62 (FIG. 4).

Also shown in FIG. 7 is a differential die 70 positioned to receive a first pressure at the top side which is the pressure $P_R$ and to receive the differential pressure $P_d$ via tube 31 at the bottom side of the diaphragm. The absolute die or device 72 receives the pressure $P_R$, as shown for example in FIG. 1.

Figure 8:
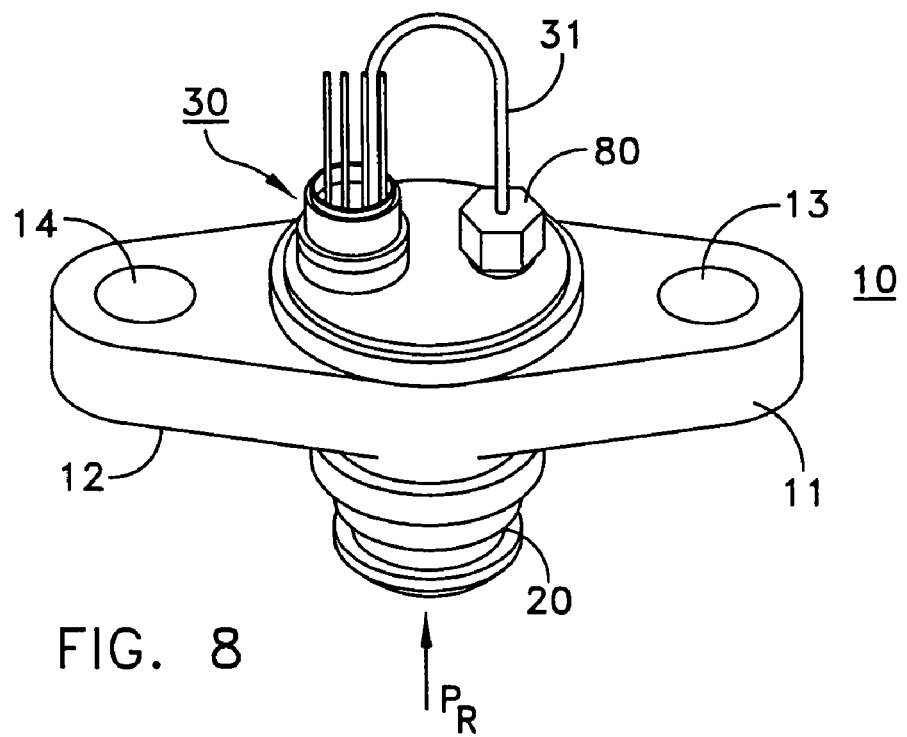
FIG. 8 depicts the dual die pressure header of FIG. 7 mounted on the pressure header of FIG. 5.

In FIG. 8 there is shown the header 30 mounted within the aperture 41 in the header 10 as depicted in FIG. 1. Also shown in FIG. 8 is a lock washer or lock nut 80 which firmly secures the reference tube 31 to the pressure header housing 10. Again similar reference numerals have been utilized to depict similar structures. It should be clear to one skilled in the art of the mechanical nature of the structures constituting the header for the die as well as the overall pressure header according to this invention.

Figure 9:
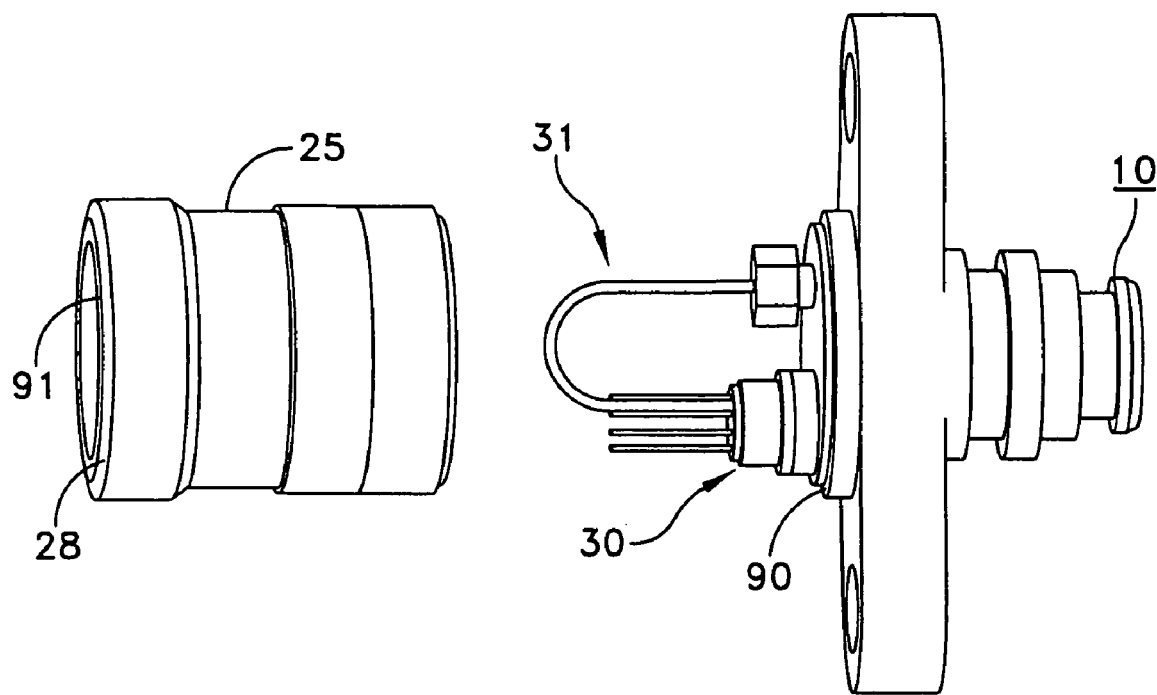
FIG. 9 is a perspective view depicting the pressure transducer assembly as shown in FIG. 1.

Referring to FIG. 9 there is shown the pressure header 10 accommodating the dual die header 30 with the reference tube 31. Shell enclosure member 25 contains the terminal board 26 as well as the contact areas. This is associated and shown with the cap member 28. Cap member 28 has an output aperture designated by reference numeral 91 through which wires or leads may be directed to an external source for operation of the device. The housing and structure described herein contains an absolute and differential pressure sensor. Each pressure sensor is a Wheatstone bridge consisting of four piezoresistors secured to a semiconductor substrate. Such devices are well known in the art.

Figure 10:
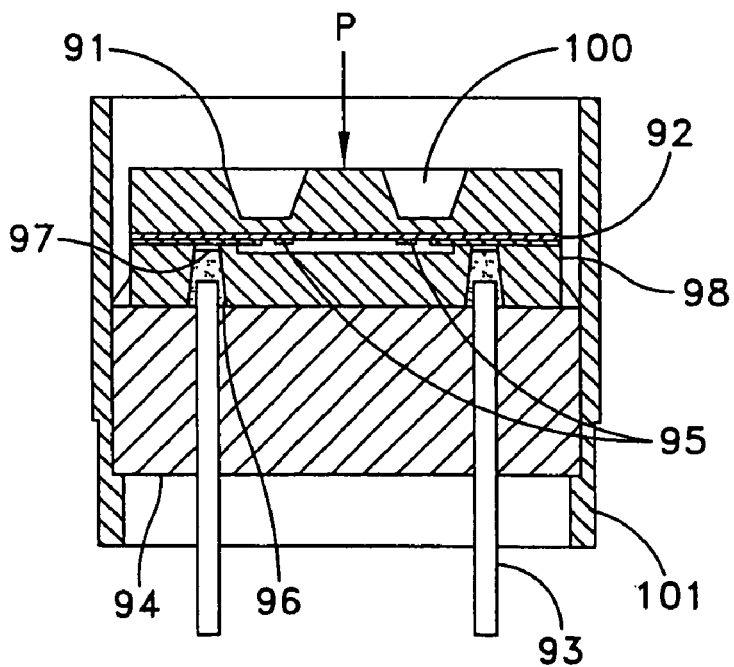
FIG. 10 is a cross-sectional view of a typical pressure sensor employing piezoresistive sensors which can be employed in conjunction with embodiments of the invention.

Referring to FIG. 10, there is shown a typical silicon sensor which basically can function as the absolute or differential die as described herein. In one configuration, silicon sensors are packaged into a pressure capsule designated as a header such as 101 to allow mechanical and electrical packaging of sensors into various environments. The sensor shown in FIG. 10 can be used as the differential or absolute sensor, also referred to as dies, as depicted, for example, in FIG. 7 as 70 and 72.

As shown in FIG. 10 a silicon chip 91 has a diaphragm area 100. The chip 91 is inorganically bonded to a special cover wafer with the holes strategically drilled in the cover. The cover wafer can be a glass contact wafer such as 98. The silicon chip 91 has a layer of silicon dioxide 92, which silicon dioxide layer 92 serves as an insulator and is bonded to the glass contact wafer 98. P type diffused monocrystalline silicon piezoresistors 95 are positioned beneath the thin diaphragm areas 100 of the sensor chip. Contacts to the piezoresistors are made through metal contact areas as 97 which are connected to contact pins as 93 through a metal to glass frit conductive substance 96. The electrical contact is made using this high temperature metal frit which is typically a mixture of high conductivity metal in appropriate physical form and glass. The frit is used to fill the holes in the cover wafer and the leadless pressure capsule is bonded to a specifically designed header at a high temperature using a conductive glass frit. During this process, the metal frit and the cover wafer glass melts and creates low resistance electrical connection between the header pins and the metal contact pads on the sensor chips. Only the non-active side of the diaphragm is exposed to the pressure medium for the absolute transducer.

This structure depicted in FIG. 10 of course can be utilized for both the absolute and differential transducers. It is understood that for the differential transducer a further hole is required to interface to the underside of the diaphragm to apply the differential pressure thereto. This structure and configuration is depicted in the above-noted U.S. Pat. No. 7,057,247. Reference is also made to the above-noted U.S. Pat. No. 6,612,179 entitled "Method and Apparatus for the Determination of Absolute Pressure and Differential Pressure Therefrom" and U.S. Pat. No. 6,272,928 entitled "Hermetically Sealed Absolute and Differential Pressure Transducer", which show pressure transducers employing Wheatstone bridge configurations with either full bridges or half bridges which can be interconnected to produce absolute and differential pressure outputs.

In accordance with the principles of the present invention, the formation of the header and the positioning of the absolute and differential Wheatstone bridges in the header enable an easy coupling of both absolute and differential pressure to the pressure sensing devices.

Figure 11:
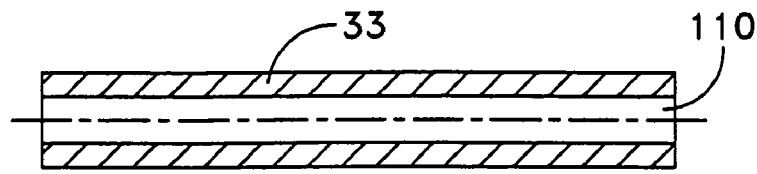
FIG. 11 is a cross-sectional view of a differential pressure accommodating tube used in embodiments of the invention.

Referring now to FIGS. 11-16, there are shown structures for accommodating the differential pressure tube 31. The tube 31 shown in FIG. 1 is an arcuate tube directing the differential pressure port to the underside of the differential sensor. As seen in FIG. 11 there is shown the tube 33, which tube at one end receives the differential pressure, which differential pressure is transmitted via the opening in the tube to the output end of the tube 33. The output end 110 receives the one input of the reference tube 31 which is inserted in to the bore 120.

Figures 12, 13:
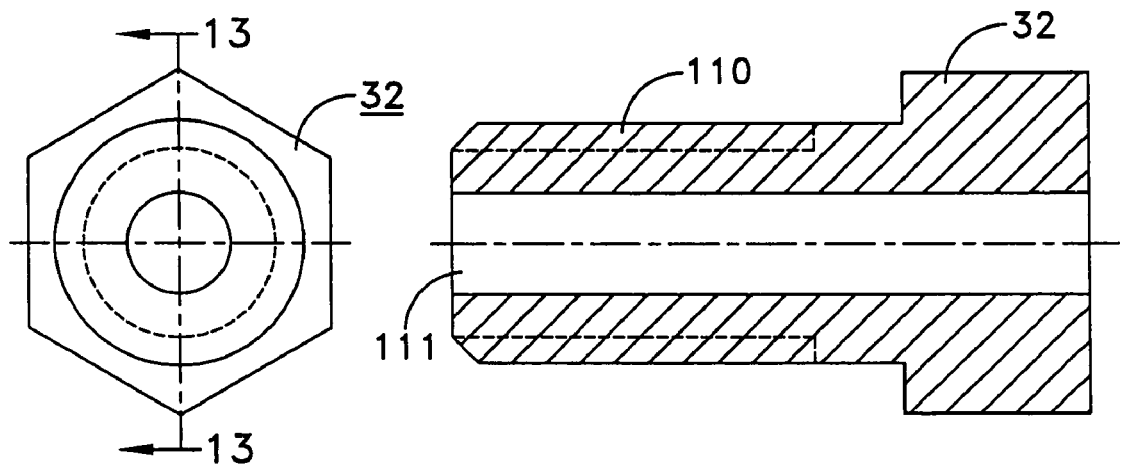
FIG. 12 is a top view of a lock nut structure employed in embodiments of the invention.
FIG. 13 is a cross-sectional view taken through line 13-13 of FIG. 12.

Shown in FIG. 12 is a top view of the lock nut section 32. The lock nut 32 has a central aperture 111 which again accommodates the tube 33. The lock nut 32 has a flange at one end coextensive with a shaft 110 which shaft 110 is directed into the aperture 45 formed within the pressure header housing section 10 (FIG. 1).

Figures 14, 15:
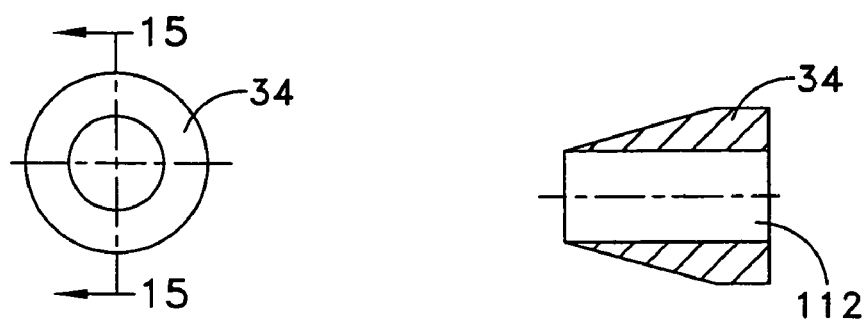
FIG. 14 is a top view of a crush nut assembly employed in embodiments of the invention.
FIG. 15 is a cross-sectional view taken through line 15-15 of FIG. 14.

Shown in FIG. 14 is a top view of the crush ring 34. The crush ring 34 also has an aperture 112 which accommodates the tube 33.

Figure 16:
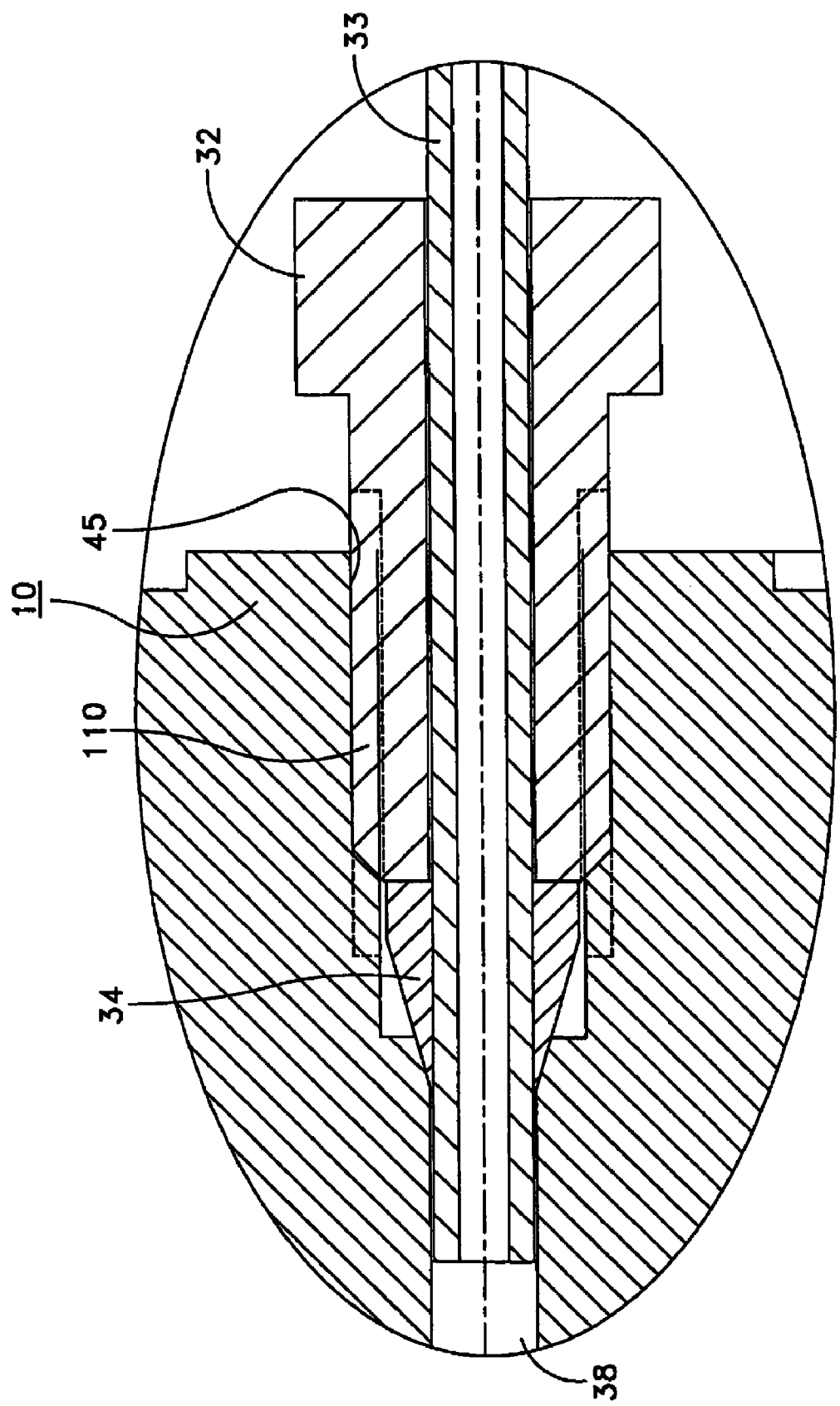
FIG. 16 is an assembly view showing the complete assembly of a differential pressure accommodating tube utilized in embodiments of the invention and utilizing the components shown in FIGS. 11-15.

Referring to FIG. 16, there is shown the assembled apparatus. As indicated, there is an aperture 45 formed in the pressure header housing 10. Into the aperture 45 is inserted shaft 110 of the lock nut 32 accommodating the tube 33 with the crush nut 34 located at one end. The differential pressure port 38 is shown therein. Essentially the entire apparatus is forced or pushed into the aperture 45 and in such a manner that the crushing ring abuts against the surfaces of the pressure header housing 10. The ring is of a soft material and basically is embedded into the housing 10 by a pressure or force exerted thereon by the lock nut 32. The lock nut 32 may be threaded or otherwise, but in any event it is turned until very little additional force can be applied. This causes the crush nut to embed within the walls of the aperture 45 formed in the header 10. This allows for an extremely tight assembly which is as strong as a bonding or ordinary mechanical installation and again requires no bonding materials or welding or any high temperature operation in order to fabricate and form the same. Such connection also forms a tight fluid impervious seal.

Therefore, in accordance with the above description, there is described a compact pressure transducer assembly which includes an active and differential sensor which are all contained in one header and which enables one to measure pressures in harsh environments, such as the fuel and oil pressure of an engine. The devices employed are silicon-on-silicon sensor elements which eliminates all p-n junctions. Such junctions would introduce instability and inaccuracy into the device, resulting in a wider error band. Thus, without p-n junction limitations static error bands of 0.1% to 0.2% are typical.

The silicon-on-silicon sensor converts pressure to an electrical signal by means of the piezoresistive effect. Each of the sensors contain four silicon strain gauges which are fusion bonded on the surface of a micromachined silicon diaphragm on which a dielectric layer of silicon dioxide has first been grown. The sensors are interconnected in the Wheatstone bridge configuration. When exposed to pressure, the micromachined silicon diaphragm deflects deforming the silicon strain gauges which have a very high rate of change in resistance when applied to stress. This will result in an imbalance in the Wheatstone bridge which imbalance is proportional to pressure measured. Therefore the bridge produces an output which is a voltage output proportional to pressure. The pressure header according to this invention has a separate header which contains the absolute and differential structures. The absolute structure is responsive to an absolute or reference pressure.

The differential sensor is responsive to the reference pressure and the differential pressure to produce an output which is the difference between both pressures. The entire structure is extremely compact and extremely rugged and can be mounted within an engine in various positions due to the simple mounting techniques and the structure of the header in general. Thus it will be apparent to one skilled in the art that there are many alternate embodiments which may be envisioned, and all of which are deemed to be encompassed within the spirit and scope of the claims appended hereto.

What is claimed is:

1. An apparatus for providing seal to a pressure tube for providing an input to a pressure port for a transducer, said apparatus comprising:
    a transducer header having a pressure port opening, said header having at least one closed surface;
    a bore opening to said pressure port opening and extending to said at least one closed surface;
    a crush ring positioned in said bore, said crush ring having a tapered outer surface which tapers from a small diameter at the front of said crush ring to a larger diameter at the end of said crush ring;
    a tube at least partially associated with said bore; and
    a lock nut surrounding a central section of said tube, wherein an end of said lock nut contacts said larger diameter of said crush ring and causes said crush ring to be forced into said bore, creating a tight pressure seal between said tube and said bore in said transducer header.

2. The apparatus for providing seal to a pressure tube of claim 1, wherein the lock nut is threaded.

3. The apparatus for providing seal to a pressure tube of claim 1, wherein the end of the lock nut has a flange coextensive with a shaft, wherein the flange and shaft are adapted to strengthen the seal to the pressure tube.

4. The apparatus for providing seal to a pressure tube of claim 1, wherein the crush ring is made of a soft material adapted to deform upon a force applied by the lock nut.

* * * * *